United States Patent [19]

van de Plassche

[11] 3,911,353

[45] Oct. 7, 1975

[54] CURRENT STABILIZING ARRANGEMENT

[75] Inventor: Rudy Johan van de Plassche, Eindhoven, Netherlands

[73] Assignee: U.S. Philips Corporation, New York, N.Y.

[22] Filed: Nov. 22, 1974

[21] Appl. No.: 526,136

[30] Foreign Application Priority Data

Dec. 4, 1973 Netherlands ........................ 7316556

[52] U.S. Cl. ............................... 323/1; 323/4; 323/9

[51] Int. Cl.$^{2}$ ........................ G05F 1/10; G05F 3/02

[58] Field of Search .................................. 323/1, 4, 9

[56] References Cited

UNITED STATES PATENTS

| | | | |
|---|---|---|---|
| 3,089,998 | 5/1963 | Reuther | 323/1 |
| 3,458,711 | 7/1969 | Calkin et al. | 307/15 |
| 3,683,270 | 8/1972 | Mattis | 323/4 |
| 3,761,741 | 9/1973 | Hoest | 323/1 |
| 3,813,607 | 5/1974 | Voorman | 323/4 X |

FOREIGN PATENTS OR APPLICATIONS

| | | | |
|---|---|---|---|
| 2,157,756 | 6/1972 | Germany | 323/4 |

OTHER PUBLICATIONS

IBM Technical Disclosure Bulletin, Vol. 15, No. 5, Oct. 1972, G. A. Hellwarth & R. C. Jaeger, "Precision Voltage Source with High Speed Polarity Control" Electronics, Apr. 20, 1969, Vol. 42.

*Primary Examiner*—William M. Shoop
*Attorney, Agent, or Firm*—Frank R. Trifari

[57] ABSTRACT

A current stabilizing arrangement with two current circuits between two common terminals. The ratio of the currents in the two current circuits is defined by a first current dividing circuit and the absolute values of said currents are defined by a second current dividing circuit, in particular by a resistance which is included in said second current dividing circuit. To ensure starting of the current dividing circuit one current circuit includes the low-ohmic input circuits of the two current dividing circuits connected in series between the common terminals and a real impedance is included between said two input circuits with parallel thereto the main current path of a transistor whose control electrode is coupled to the other current circuit.

6 Claims, 3 Drawing Figures

CURRENT STABILIZING ARRANGEMENT

Figure 1:
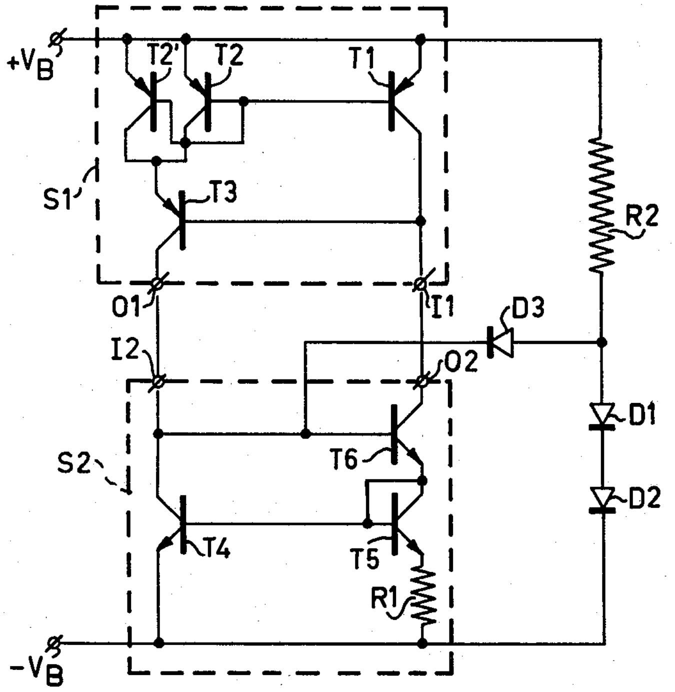

The invention relates to a current stabilizing arrangement, which comprises a first and a second current circuit between a fist and a second common terminal, a first current dividing circuit with transistors of a first conductivity type, which has an input circuit with a low input impedance and an output circuit with a high output impedance, and a current dividing circuit with transistors of a second conductivity type, which also has an input circuit with a low input impedance and an output circuit with a high output impedance, the first current dividing circuit defining the ratio of the currents flowing in the two current circuits, and the second current dividing circuit by parallel connection of a semiconductor junction with the series connection of a semiconductor junction and a frist resistance defining the absolute values of said currents in the two current circuits.

In this respect a current dividing circuit in its general sense is to be understood to near a circuit in which by parallel connection of semiconductor junctions, in combination with resistances or not, uniquely defines the ratio of the currents in the input and output circuit.

Such a current stabilizing arangement is for example known from German patent application Ser. No. 2,140,692 which has been laid open for public inspection. A problem associated with such current stabilizing arrangements is that said arrangements, apart from a stable state in which the desired currents occur, also have a stable state in which the currents are zero. This implies that said current stabilizing arrangements require an additional starting circuit to ensure that when the power supply is switched on the desired stable state with the desired currents not equal to zero is assumed.

In the current stabilizing arrangement described in said German patent application said starting circuit consists of the series connection of a resistance and a pair of diodes in forward direction between the two power supply terminals and a third diode, which connects the connection point of the resistance and one of the diodes to a suitable connection point of the current stabilizing arrangement. When the power supply is switched on there will be a current through the series connection of the resistance and diodes, so that a voltage appears across the series connection of the two diodes such that the third diode is biassed in forward direction and via said third diode a starting current is applied to the connection point, so that the current stabilizing arrangement is energized and assumes the desired stable state. The connection point is then selected so that once the current stabilizing arrangement has assumed the desired stable state the third diode is reverse biassed and is consequently cut off.

The use of such a starting circuit has some drawbacks. First of all the total current consumed by the stabilizing arrangement is non-stabilized, for the starting circuit consumes a certain non-stabilized current. If the current through said starting circuit is to be minimized, the resistance in said starting circuit must be very high. As a result, said resistance cannot readily be made in integrated form, so that it may even be necessary to employ a discrete resistor. Furthermore, it is obvious that the starting circuit causes a certain power dissipation.

It is an object of the invention to provide a current stabilizing arrangement with starting circuit which obviates said drawbacks. For this, the invention is characterized in that the first current circuit comprises the series connection of the input circuits of the two current dividing circuits and the second current circuit includes the series connection of the output circuits of the two current dividing circuits, and that the first current circuit between the input circuits of the two current dividing circuits includes a real impedance, which is shunted by the main current path of a transistor whose control electrode is coupled to the second current circuit.

Generally, the real impedance will of course be constituted by a resistance. However, in the case of circuitry embodying integrated circuit technology it is common to realise real impedances with the aid of a buried or non-buried layer of an epitaxial material, usually in the form of a field-effect transistor whose channel provides the desired resistance. Hereinafter only the embodiment with a resistance will be described, but this does not imply that the scope of the invention is limited to said embodiment.

The step according to the invention ensures that immediately after the power supply is switched on a current is obtained via the input circuit of the first current dividing circuit, the real impedance and the input circuit of the second current dividing circuit. However, it is obvious that the current through said real impedance is not in accordance with the value of the current in the first current circuit as prescribed by the second current dividing circuit. The overall current in said first current circuit, however, is automatically adjusted to said desired, prescribed value by the additional transistor, of which the current through the main current path is added to the current through the real impedance. The only requirement to be met is that said impedance should have such a value that the current through said impedance is smaller than the current in the first current circuit dictated by the second current dividing circuit.

Figure 2:
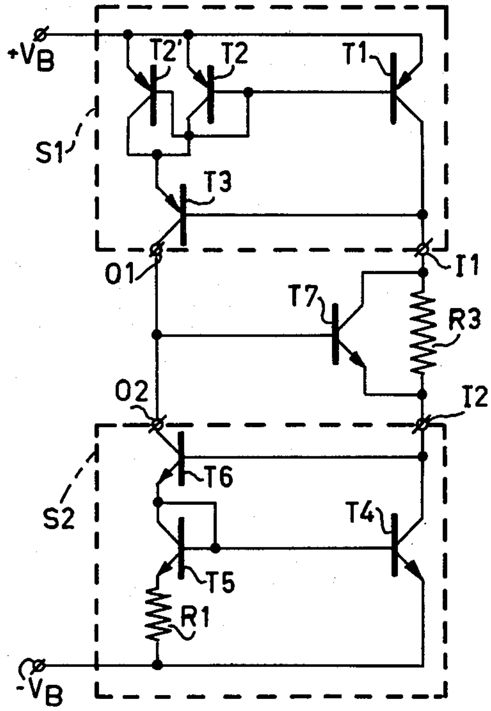
Figure 3:
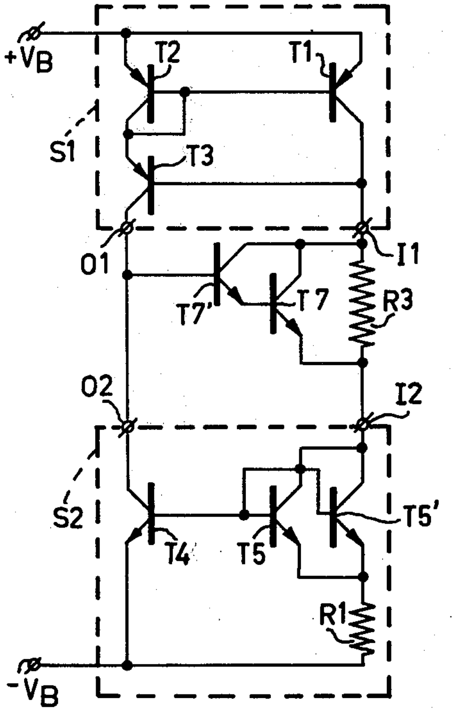

The invention will be described hereinafter with reference to the drawing, in which FIG. 1 shows the known current stabilizing arrangement, and FIGS. 2 and 3 show two embodiments of the current stabilizing arrangement according to the invention.

The current stabilizing arrangement known from the cited German patent application which is shown in FIG. 1 comprises a first current dividing circuit $S_1$ with transistors of the pnp-type. Said current dividing circuit $S_1$ includes two transistors $T_1$ and $T_2$ with parallel-connected base-emitter paths. However, transistor $T_2$ has a larger emitter area than transistor $T_1$, which is schematically represented by transistor $T_2'$, which is fully connected in parallel with transistor $T_2$. In series with the transistors $T_2$ and $T_2'$, which are connected as diodes, a further transistor $T_3$ is included, whose base is connected to the collector of transistor $T_1$. Said base of transistor $T_3$ constitutes the input terminal $I_1$ of the current dividing circuit and has a low input impedance, whilst the collector of transistor $T_3$ forms the output terminal and has a high output impedance. As a result of the parallel connection of the base-emitter paths of the transistors $T_1$ and $T_2$ said first current dividing circuit fully defines the ratio of the currents at the input terminal $I_1$ and the output terminal $o_1$ said ratio being equal to the ratio of the effective emitter areas of the transistors $T_1$ and $T_2$.

The current stabilizing arrangement includes a second current dividing circuit $S_2$ with transistors of the npn-type. Said current dividing circuit $S_2$ includes a transistor $T_4$ whose base-emitter path is connected in parallel with the series connection of a transistor $T_5$, which is connected as a diode, and a resistance $R_1$. In series with said resistance $R_1$ and the transistor $T_5$ which is connected as a diode a transistor $T_6$ is included, whose base is connected to the collector of transistor $T_4$ and constitutes the low-ohmic input $I_2$ of the second current dividing circuit $S_2$, whilst the collector of said transistor $T_6$ forms the high-ohmic output $O_2$ of said current dividing circuit $S_2$.

The input $I_2$ of the second current dividing circuit $S_2$ is connected to the output $O_1$ of the first current dividing circuit $S_1$ and the output $O_2$ of the second current dividing circuit $S_2$ to the input $I_1$ of the first current dividing circuit. The first current dividing circuit $S_1$ determines the ratio of the currents in the current circuits between the two supply terminals $+V_B$ and $-V_B$, which ciircuits are formed by the said connections of the inputs and outputs of the two current dividing circuits. Since in the second current dividing circuit $S_2$ said current ratio can only exist at one specific absolute value of these two currents, whose magnitude is determined by the magnitude of the resistance $R_1$ in conjunction with the current ratio, the absolute value of the two currents is fully defined and is substantially independent of the supply voltage.

The current stabilizing arrangement thus obtained also has a stable state in which the currents in the two current circuits are zero. In order to exclude the occurrence of said stable state a starting circuit is provided which consists of the series connection of a resistance $R_2$ and two diodes $D_1$ and $D_2$ between the two supply terminals $+V_B$ and $-V_B$ and a diode $D_3$, which connects the connection point between the resistance $R_2$ and the diode $D_1$ to the base of transistor $T_6$ in the second current dividing circuit $S_2$. Via said diode $D_3$ a current is injected into said base of transistor $T_6$ upon application of the supply voltage so that the current stabilizing arrangement is energized and assumes the desired stable state. Once this has happened, diode $D_3$ is cut off and no longer carries any current.

As is evident from the Figure, the total current consumed by the current stabilizing arrangement is no longer stabilized owing to said starting circuit, for the series connection of the resistance $R_2$ and diodes $D_1$ and $D_2$ carry non-stabilized currents. If said non-stabilized part of the total current is to be minimized, the resistance $R_2$ should be high. In some cases this may present integration-technical problems so that it may be necessary to select a discrete resistor for $R_2$. Furthermore, said starting circuit will always dissipate extra power.

Said drawbacks do not occur in the current stabilizing arrangement according to the invention, of which a first embodiment is shown in FIG. 2. Said embodiment of FIG. 2 comprises a first current dividing circuit $S_1$, which is fully identical to the current dividing circuit $S_1$ shown in FIG. 1, and a second current dividing circuit $S_2$ which is fully identical to the current dividing circuit $S_2$ shown in FIG. 1. However, in contradistinction to the circuit arrangement of FIG. 1 the inputs $I_1$ and $I_2$ of the two current dividing circuits $S_1$ and $S_2$ are interconnected as is the outputs $O_1$ and $o_2$. Furthermore, the connection between the two inputs $I_1$ and $I_2$ of the two current dividing circuits $S_1$ and $S_2$ includes a resistance $R_3$, which is shunted by the collector-emitter path of an npn-transistor $T_7$, whose base is connected to the outputs $O_1$ and $O_2$ of the two current dividing circuits.

This design ensures that the current stabilizing arrangement is started without requiring a starting circuit in parallel with the two current circuits, with the consequent drawbacks. When the power supply is switched on substantially the full supply voltage appears across the resistance $R_3$, which ensures that there is a current through said resistance $R_3$. Said current drives both the base of transistor $T_3$ and the base of transistor $T_6$, so that said transistors and thus all the other transistors become conducting and the current stabilizing arrangement is started.

Generally, the current through the resistance $R_3$ which is determined by the value of said resistance will not be in accordance with the currents at the inputs $I_1$ and $I_2$ which are determined by the current dividing circuits $S_1$ and $S_2$. However, the transistor $T_7$ automatically ensures that the sum of the currents through said resistance $R_3$ and said transistor $T_7$ is in accordance with said currents at the inputs $I_1$ and $I_2$. However, the only proviso then to be made is that the value of the resistance $R_3$ is chosen such that the current through said resistance at the maximum supply voltage is smaller than the specified currents at the inputs $I_1$ and $I_2$, so that transistor $T_7$ is conducting in any case.

Since the resistance $R_3$ is included in one of the current circuits, it will not give rise to additional dissipation. Furthermore, the total current consumed is fully stabilized and finally said resistance $R_3$ can still be integrated reasonably well, so that the drawbacks of the known circuit arrangement are obviated in a very simple manner.

FIG. 3 shows a second embodiment of the current stabilizing arrangement according to the invention. The arrangement again includes a first current dividing circuit $S_1$ with the transistors $T_1$, $T_2$ and $T_3$ in analogy with the preceding circuits. The only difference with respect to the first current dividing circuit $S_1$ employed in the preceding current stabilizing arrangements is that it is now assumed that the transistors $T_1$ and $T_2$ have equal emitter areas, so that the currents at the input $I_1$ and the output $O_1$ of said current dividing circuit $S_1$ are necessarily equal. The second current dividing circuit $S_2$ now comprises the transistor $T_4$, whose base-emitter path is connected in parallel with the series-connection of the transistor $T_5$ which is connected as a diode and the resistance R. The input $I_2$ of said current dividing circuit $S_2$ is now constituted by the short-circuited base-collector of transistor $T_5$ and the output $O_2$ by the collector of transistor $T_4$. The inputs $I_1$ and $I_2$ and the outputs $O_1$ and $O_2$ of the two current dividing circuits are again coupled to each other.

Because the current dividing circuit $S_1$ introduces equal curents into both current circuits, transistor $T_5$ in the second current dividing circuit in the present embodiment of the current stabilizing arrangement, as known, should have a greater area than transistor $T_4$, which is represented by a transistor $T_5'$ in parallel with transistor $T_5$.

Again, the resistor $R_3$ is included between the inputs $I_1$ and $I_2$ of the two current dividing circuits $S_1$ and $S_2$, with the transistor $T_7$ parallel thereto, which by way of example may form part of a Darlington pair $T_7$, $T_7'$.

Further, the operation of the arrangement is fully identical to that of FIG. 2.

It is to be noted that the configuration consisting of the transistors $T_4$, $I_5$, resistance $R_1$ and the transistor $T_7$, $T_7'$ bears a great resemblance to the current dividing circuit $S_1$ shown in FIG. 1, to which merely the resistance $R_3$ appears to be added. However, the function of the transistor $T_7$ in FIG. 3 is totally different from that of transistor $T_6$ in FIG. 1. Said transistor $T_6$ in known manner provides a compensation for the influence of the base current of transistor $T_4$ on the magnitude of the input and output current of the current dividing circuit, for which it is essential that said two transistors $T_4$ and $T_6$ carry approximately equal currents. Transistor $T_7$, $T_7'$ in FIG. 3, however, has a controlling function, i.e. to supplement the current flowing through the resistance $R_3$ to the correct value, and certainly does not serve to compensate for the base current of transistor $T_4$, because the currents through said transistors will differ substantially.

It will be evident that the scope of the invention is by no means limited to the embodiments shown in the two Figures. The two current dividing circuits may be of any known design. For example, the current ratio in the two current circuits may alternatively be defined with the aid of resistances in the emitter circuits of the transistors $T_1$ and $T_2$. Furthermore, the conductivity type of the transistors of the two current dividing circuits may of course readily be changed, so that the current dividing circuit with npn-transistors determines the current ratio and the current dividing circuit with the pnp-transistors the absolute values of these currents in the two current circuits.

Finally, it is to be noted that the starting means employed in the current stabilizing arrangement according to the invention may also be used in a current stabilizing arrangement in which instead of a current dividing circuit $S_1$ two transistors with parallel-connected base-emitter paths are used, the base electrodes of said transistors receiving a control signal via a regulating transistor. Such a current stabilizing arrangement is for example described in U.S. patent application Ser. No. 470,273, FIG. 3. Instead of the starting circuit shown in said Figure, it is alternatively possible to connect an additional resistance in parallel with the collector-emitter path of the regulating transistor $T_9$.

What is claimed is:

1. A current stabilizing arrangement, which comprises a first and a second current circuit connected between a first and a second supply terminal, said first and second current circuits comprising, a first current dividing circuit with transistors of a first conductivity type, which has an input circuit with a low input impedance and an output circuit with a high output impedance, a second current dividing circuit with transistors of a second conductivity type also having an input circuit with a low input impedance and an output circuit with a high output impedance, the first current dividing circuit defining the ratio of the currents flowing in the two current circuits, and the second current dividing circuit defining the absolute values of the two currents which flow in the two current circuits by the parallel connection of a first semiconductor junction with the series connection of a second semiconductor junction and a first resistance, the first current circuit including the series connection of the input circuits of the two current dividing circuits and the second current circuit including the series connection of the output circuits of the two current dividing circuits, a real impedance included in the first current circuit between the input circuits of the two current dividing circuits, a transistor with its main current path connected in shunt with the real impedance, and means coupling the transistor control electrode to the second current circuit.

2. A current stabilizing arrangement as claimed in claim 1 wherein the real impedance has such a resistance value that the current through said impedance at the maximum supply voltage is smaller than the current dictated by the two current dividing circuits in the first current circuit.

3. A current stabilizing arrangement as claimed in claim 1 wherein the first and second current circuits are connected in parallel between said first and second supply terminals and the first current dividing circuit includes the main current path of a first transistor of said first conductivity type connected in the first current circuit and first diode means connected in the second current circuit, and a second transistor of said first conductivity type with its main current path connected in series with said first diode means in the second current circuit and having a control electrode connected to the input circuit of the first current dividing circuit.

4. A current stabilizing arrangement as claimed in claim 3 wherein said first semiconductor junction comprises a third transistor of said second conductivity type having a main current path in series in one of said current circuits and the second semiconductor junction is connected in series in the other of said current circuits.

5. A current stabilizing arrangement as claimed in claim 4 wherein said third transistor is connected in series with the main current path of the first transistor in the first current circuit, and said second semiconductor junction comprises second diode means connected in series with the first diode means and the main current path of the second transistor in the second current circuit.

6. A current stabilizing arrangement as claimed in claim 4 wherein said third transistor is connected in series with the main current path of the second transistor in the second current circuit, and said second semiconductor junction comprises second diode means connected in series with the first transistor main current path and said real impedance in the first current circuit.

* * * * *